United States Patent [19]
Harris et al.

[11] Patent Number: 5,894,349
[45] Date of Patent: Apr. 13, 1999

[54] MANUFACTURING METHOD INCLUDING NEAR-FIELD OPTICAL MICROSCOPIC EXAMINATION OF A SEMICONDUCTOR SUBSTRATE

[75] Inventors: Timothy Dean Harris, Toms River; David Novak, Piscataway; Qing Wang, New Providence, all of N.J.

[73] Assignee: Lucent Technologies Inc., Murray Hill, N.J.

[21] Appl. No.: 08/919,192

[22] Filed: Aug. 20, 1997

[51] Int. Cl.⁶ .................................................. G01B 11/00
[52] U.S. Cl. ........................................ 356/372; 356/128
[58] Field of Search ............................. 356/372; 430/30, 430/128

[56] References Cited

U.S. PATENT DOCUMENTS 5,362,585  11/1994  Adams ........................................ 430/30
5,656,182   8/1997  Marchmann et al. ....................... 430/4

OTHER PUBLICATIONS

Schiavone et al, Microelectronic Engineering, 30, 1996, pp. 571–574.

*Primary Examiner*—F. L. Evans
*Attorney, Agent, or Firm*—Richard J. Botos

[57] ABSTRACT

A system for analyzing a sample is disclosed. The system includes a light-transmitting probe with a light emitting tip having a diameter that is less than one-wavelength of light. The system is adapted to place the probe in close proximity to the sample without physically contacting the sample with the probe, and to move the sample relative to the probe such that light transmitted from the probe is directed onto the desired portion of the sample surface. The system further include a light source which transmits light into the probe tip. The system also includes a detector which detects a portion of the light transmitted through the sample. The detector is configured to detect that portion of the light that was incident on the sample surface at an angle greater than the critical angle. The detector is equipped with an aperture through which passes substantially all of the light that was incident on the surface at an angle less than the critical angle and which was transmitted through the sample. The system further analyzes the light received by the detector to determine the relative index of refraction of a material at one point on the surface of the sample relative to the index of refraction of the material at another point on the surface of the sample.

16 Claims, 5 Drawing Sheets

MANUFACTURING METHOD INCLUDING NEAR-FIELD OPTICAL MICROSCOPIC EXAMINATION OF A SEMICONDUCTOR SUBSTRATE

BACKGROUND OF THE INVENTION

1. Technical Field

This invention relates to optical microscopes in which a small aperture, typically smaller than an optical wavelength, is positioned within the optical near field of a specimen, i.e., within a distance of less than about an optical wavelength of the specimen, and the aperture is scanned in raster fashion over the surface of the specimen to produce a space-varying optical signal that is detected and reconstructed to produce an image having extremely high resolution. The invention further relates to methods for using such microscopes to inspect workpieces during their manufacture.

2. Art Background

Microscopes employing conventional optical imaging systems cannot resolve features substantially smaller than about one-half an optical wavelength. That is, when both the entrance pupil of the microscope objective and its distance from the specimen are substantially larger than a wavelength, diffraction effects limit the smallest resolvable separation between a pair of object points to $0.5 \, \lambda/N.A.$, where $\lambda$ is the optical wavelength and N.A. denotes the numerical aperture of the objective which, as a practical matter, is limited to values of about 1.4 or less. (F. A. Jenkins and H. E. White, *Fundamentals of Optics*, pp. 306–308 (3rd ed. 1957).

Near-field microscopy has been successful in resolving features much smaller than those resolvable with conventional optical microscopy. One such microscope is disclosed in U.S. Pat. No. 5,288,999 to Betzig et al., the disclosure of which is incorporated by reference. The microscope described in Betzig et al. is described with reference to FIG. 1. The optical system includes a light source 10, a probe 20, displacement means 30 for displacing the probe relative to an object 40 disposed, for example on a stage 50, adjacent the probe tip 60. The optical system further comprises a light source 10 optically coupled to a probe 20. A single-mode fiber 70 can be used as the optical coupling. Light source 10 is, for example, a laser. Light from source 10 is injected into the optical fiber by way, e.g., of a single-mode coupler 80, which includes a microscope objective 90 and a fiber positioner 100. A mode stripper 110 is also optionally included in order to insure that only the single mode in the core is propagated to the probe, and the other modes in the cladding. The displacement means 30 may, for example, be a piezoelectric tube adapted for moving the probe vertically as well as in two orthogonal lateral dimensions. Alternatively, the displacement means may be mechanical or piezoelectric means for moving the stage rather than the probe, or some combination of stage-displacement and probe-displacement.

Near-field microscopy has been used to detect very subtle changes in the surface of a sample. For example, near-field optical microscopy has been used to inspect latent images in energy-sensitive resist material used in lithographic processes for semiconductor device fabrication. The latent image is the image introduced into the energy-sensitive resist material by exposing the material to patterned radiation. The results of the inspection have been used to control the process parameters in lithographic processes for device fabrication. Such a technique is described in Marchman, H., et al., "Near Field Optical Latent Imaging With the Photon Tunneling Microscope," *Applied Physics Letters*, Vol. 66 (24), pp 3269–3271 (1995) In the technique, near-field imaging is used to inspect the latent image introduced into the resist via a patternwise exposure to radiation. A spatially resolved image of the latent features is obtained and the spatially resolved image is compared with the desired pattern. The spatially resolved image is a picture of the intensity of the light either reflected from or transmitted through a point on the sample relative to the intensity of the light either reflected from or transmitted through other points on the sample. The variations in intensity are cause by variations in the index of refraction and the topography of the resist material as a result of the patternwise exposure to radiation. These dark and light areas provide an image of a pattern introduced into the energy sensitive resist material.

Because latent image metrology is a non-destructive technique that provides information in real time, improvements in the techniques which provide even greater information about the latent image are desired.

SUMMARY OF THE INVENTION

The present invention is directed to a near field scanning microscope. The microscope has a probe, at least a portion of which is optically transmissive at least at one wavelength of light. The probe has a proximate end and a distal end. The probe has an optical aperture at the distal end which has a diameter that is smaller than at least one wavelength of light for which the probe is optically transmissive. The proximate end of the probe is optically coupled to a light source. At least some of the light emitted by the source at the at least one wavelength enters or exits the probe through the aperture. The probe is movable relative to an object which is inspected by the probe. The microscope is adapted to receive the object.

The microscope also has a detector which detects the light transmitted through the object. For convenience, the side of the object on which the light from the probe is incident is referred to as the front side. (In FIG. 3, the front side of the sample is layer 211.) The side of the object opposite the front side is referred to as the backside. The microscope also has at least a first detector (e.g. 270 in FIG. 3) which is configured to receive a desired portion of the light transmitted through the backside of the object (e.g. 210 in FIG. 3) being inspected by the microscope. The detector is configured and placed to detect the desired portion of the light transmitted through the object.

In the present invention, the light selectively detected by the detector is the light excited in the sample and transmitted therethrough at an angle greater than an angle that is known as the critical angle. For purposes of the present invention, the critical angle is the angle of incidence of light on the surface of the object (the interface between the object and the surrounding atmosphere) at which total reflection of light occurs. Light incident on the object's surface at an angle less than the critical angle is termed allowed light. Light incident on the object's surface at an angle greater than or equal to the critical angle is termed forbidden light. The light selectively detected by the detector is the forbidden light, which is the light excited in the sample by the near-field light incident thereon that is transmitted through the sample at an angle greater than the critical angle.

In one embodiment illustrated in FIG. 9, the detector 400 is equipped with a region 410, which blocks the transmission of the allowed light therethrough. In a second embodiment, the detector is equipped with a detector aperture through which the allowed light is transmitted. The detector aperture has a diameter sufficient to permit the passage of light therethrough that is transmitted through the object at an angle less than the critical angle. The placement of the detector aperture relative to the probe aperture and the object is such that substantially all of the allowed light that is transmitted through the sample passes through the detector aperture. In one embodiment, the allowed light is collected by an objective and transmitted to a second photodetector.

The first detector is fashioned to detect substantially only the forbidden light transmitted through the object. The first detector is optically coupled to the backside of the object. Since the purpose of the detector is to collect the forbidden light transmitted through the object, the object is coupled to the first detector with materials that transmit and do not significantly absorb, reflect, or refract the forbidden light. In one embodiment, the first detector is optically coupled to the backside of the object using a series of optical media, including a glue, a cover slip, and immersion oil. It is advantageous if the optical media have an index of refraction that is approximately equal to the index of refraction of the object. In the embodiment of the present invention wherein the object is fused silica with an index of refraction of about 1.46, a glue with an index of refraction of about 1.524, a cover slip with an index of refraction of 1.55, and an immersion oil with an index of refraction of 1.479 are contemplated as suitable.

In one embodiment of the present invention, the first detector is a photodiode. The intensity of the forbidden light incident on the photodiode is monitored. A change in the intensity of the forbidden light indicates a change in the refractive index and/or topography on the object.

Thus, the apparatus of the present invention is particularly suited to inspect the surface of an object to identify regions with different indices of refraction. For example, in a lithographic process for semiconductor device fabrication, a very precise image of a desired pattern is delineated in an energy sensitive material applied onto a substrate (e.g. fused silica).

To delineate the desired pattern, the energy-sensitive material is patternwise exposed to radiation. The exposure causes a chemical change in the energy-sensitive material. The exposed, chemically altered, portion of the energy-sensitive material has an index of refraction that is different from the index of refraction of the unexposed portion. The first detector monitors the intensity of the forbidden light transmitted through the object (the object is the substrate with the energy-sensitive material thereon). The intensity of the forbidden light transmitted through the object with the exposed energy-sensitive material is detectably different from the intensity of the forbidden light transmitted through the object with the unexposed energy-sensitive material. Thus, the signal from the first detector indicates whether the forbidden light was transmitted through the exposed portion or unexposed portion of the energy-sensitive material. Signal intensity, mapped as a function of position, provides a "picture" of this latent image in the energy-sensitive material.

In one embodiment of the present invention, the first detector is a photodiode divided into segments in order to subtract some of the noise from the signal. For example, if the photodiode is divided into four segments, those segments can be used to provide an integrated signal (the sum of the signal from each quadrant) and a differential signal (the sum of two adjacent quadrants less the sum of the other two adjacent quadrants).

The signals from the photodiode are then used to create an image of the latent image in the energy sensitive material.

The image so obtained is then compared with a desired image. If the correspondence between the image obtained using the first detector and the desired image is not within an acceptable limit, the exposure conditions are adjusted to obtain the desired correspondence. Techniques for controlling a lithographic process by obtaining a spatially resolved image of a latent image are described in U.S. Ser. No. 08/391,905 entitled "A Process for Fabricating a Device in Which the Process is Controlled by Near-Field Imaging Latent Features Introduced Into Energy Sensitive Resist Materials" to Marchman et al., which was filed on Feb. 21, 1995 and is hereby incorporated by reference.

DETAILED DESCRIPTION

Figure 1:
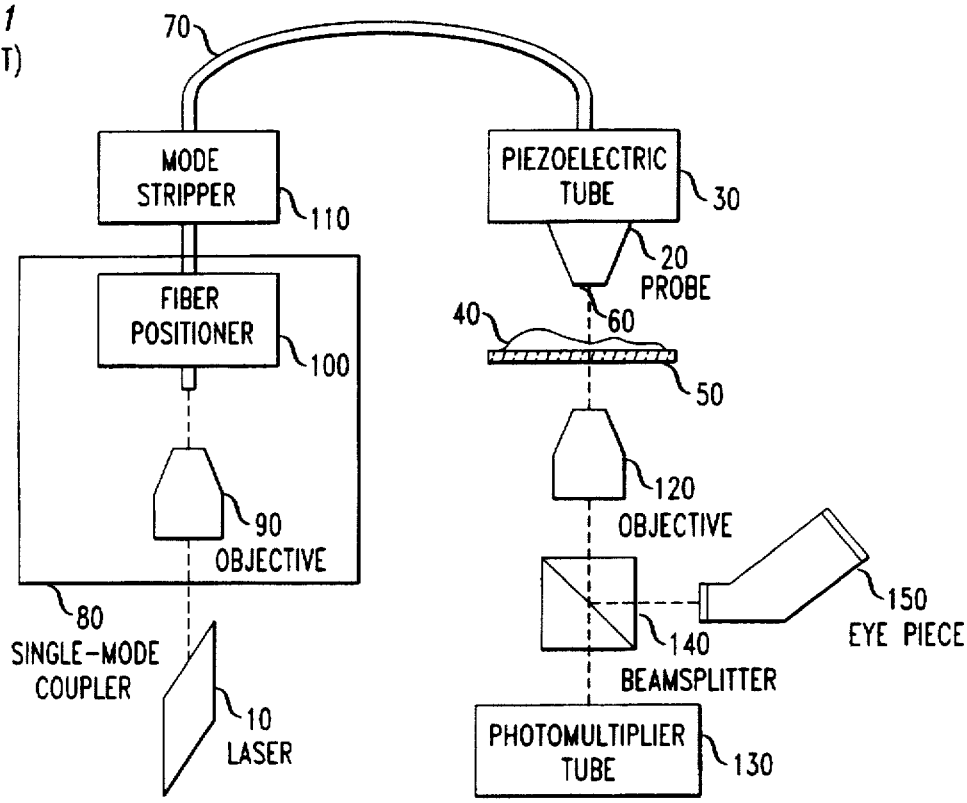
FIG. 1 is a schematic illustration of a prior art NSOM apparatus.
Figure 2:
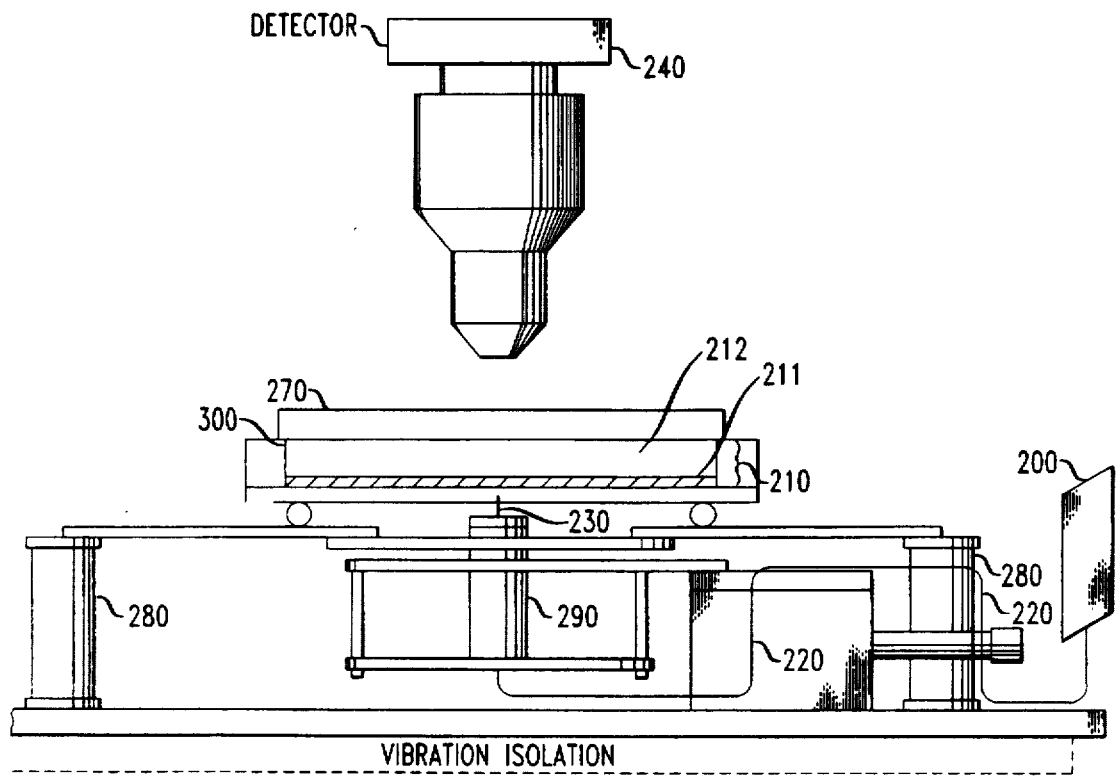
FIG. 2 is a schematic illustration of an NSOM apparatus of the present invention.

A schematic of the near-field scanning optical microscope (NSOM) of the present invention is illustrated in FIG. 2. The NSOM apparatus is configured for use in the transmission mode (i.e., the sample is scanned on one side of the wafer and the optical microscope collects the light transmitted through the sample). Light with a wavelength, for example, of about 6328 Å from a laser is introduced onto the sample. Typically, the sample is a layer of energy sensitive resist material that has been patternwise exposed to radiation. The light is transmitted through an optical fiber 220 and through a probe 230 which is positioned within the near-field distance (e.g. about 5 nm to about 20 nm) from the surface of the sample 210. The probe 230 and the sample 210 are mounted so that they are movable relative to each other. The apparatus used to effect such relative movement is described in U.S. Pat. No. 5,288,998 to Betzig, which is incorporated by reference into this disclosure.

Figure 3:
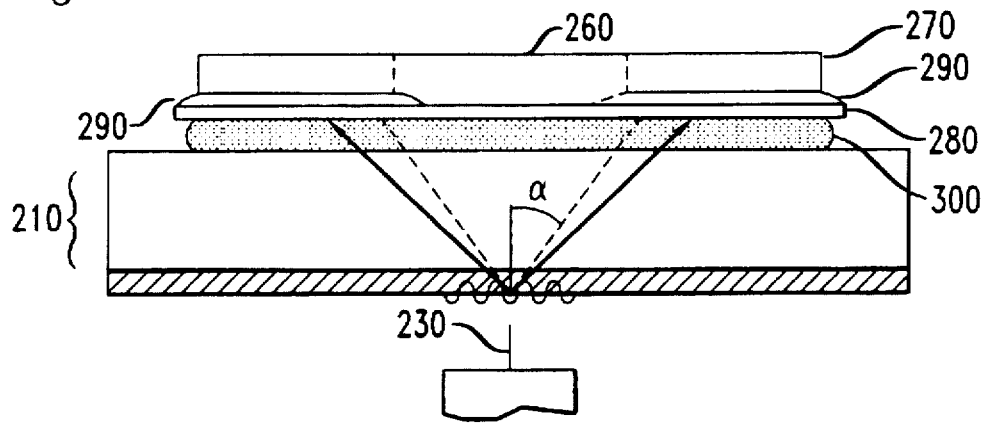
FIG. 3 is a detail view of the detector portion of the NSOM apparatus illustrated in FIG. 2 with the aperture in the detector shown in phantom.

The light transmitted through the sample at an angle less than the critical angle is transmitted through a detector aperture 260 (FIG. 3) in detector 270. The light transmitted through the detector aperture 260 (FIG. 3) in detector 270 is optionally collected by a detector 240 (FIG. 2). As illustrated in FIG. 3, evanescent light from the near-field tip 230 enters the surface 211 of the sample 210 at an angle greater than the critical angle α. This light excites light that is transmitted through the sample 210 at an angle greater than the critical angle (i.e. the forbidden light) and onto the detector 270. The signal from the detector 270 is then used to obtain an image of the latent image in the surface 211 of the sample 210. As illustrated in FIG. 3, the detector 270 is affixed to a cover slip 280 for the sample 210 with an index matching glue 290. As previously stated, it is advantageous if the index of refraction of the glue is approximately equal to the index of refraction of the sample at the interface between the sample and the glue. In the embodiment of the present invention wherein the sample is a fused silica substrate with a layer of energy sensitive material formed thereon, it is advantageous if the index of refraction of the glue is approximately equal to the index of refraction of the fused silica, which is 1.46. One skilled in the art will appreciate that the index of refraction of the glue does not have to be identical to the index of refraction of the object in order to achieve the objectives of the invention. One skilled in the art will also appreciate that the larger the difference between the index of refraction of the glue and the index of refraction of the object, the greater the degree of reflection that will occur at the interface between the two materials. Since it is advantageous for the amount of reflection that occurs at the interface between two materials to be small, it is advantageous in the indices of refraction of the two materials are in sufficient proximity to achieve this result. The glue is also selected so that it is substantially transparent at the wavelength of the exposing radiation.

The space between the sample 210 and the cover slip 280 is filled with an immersion oil. The materials for the immersion oil and cover slip are also selected so that the forbidden light is transmitted through these materials without significant diffraction, reflection, or absorption. Consequently, it is advantageous if the index of refraction of these materials be approximately equal to the index of refraction of the adjacent materials. As previously noted, the acceptable amount of difference between the indices of refraction of two adjacent materials is determined readily by one skilled in the art. One skilled in the art will also appreciate the need for the immersion oil and cover slip to be substantially transparent at the wavelength of the exposing radiation.

The following is a description of an NSOM apparatus with a first detector with particular characteristics. These particular characteristics are provided to illustrate how the detector is used to obtain an image of a sample's surface by detecting change in the refractive index of the sample's surface. The characteristics of the exemplary detector are not intended to limit the scope of the invention as defined by the appended claims, but are exemplary characteristics of one embodiment of the present invention.

An NSOM apparatus in the transmission mode as previously described was equipped with a ring-shaped photodiode which was placed in the apparatus to measure the intensity of the forbidden light transmitted through the sample. The diameter of the diode was 6.5 mm. The diode had an aperture with a diameter of 1 mm in the center thereof.

The photodiode was glued to a coverslip with a glue that had an index of refraction, when cured, of 1.524. The glue was Norland Optical Adhesive 65 obtained from Norland Products, Inc. An index matching immersion oil filled the space between the cover slip and the backside of the sample. The oil was type FF non-drying immersion oil obtained from P. P. Cargille Laboratories.

Figure 4:
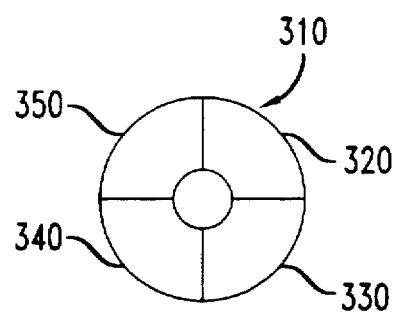
FIG. 4 is an illustration of a segmented photodetector used in the apparatus of the present invention.
Figure 9:
FIG. 9 illustrates a detector with a region that blocks the transmission of the allowed light therethrough.

The detector 310 was divided into four segments, 320, 330, 340 and 350, as illustrated in FIG. 4. Using conventional circuitry, both the integrated signal from the four quadrants (320+330)+(340+350) and the differential signal from opposite segments (320+330)−(340+350) was measured.

The sample was mounted on a sample holder to which was attached the scanning piezo tube 280 (FIG. 2). The distance between the fiber and the sample was controlled by a non-optical feedback technique. The sample holder and scanning piezo tube distance controller are conventional aspects of NSOM apparatus and are well known to one skilled in the art. An ac signal of 20 mV was used to drive dithering piezo 290 (FIG. 2) at the resonant frequency of the fiber. The driving mechanism and the need to drive the piezo at the resonant frequency of the fiber are also conventional aspects of NSOM apparatus and are well-known to one skilled in the art. As the probe tip approaches the surface of the sample, the electrical impedance between the two quadrants of the dithering piezo tube changes. The change in impedance was used to control the separation between the probe and the tip. This technique is described in greater detail in Hsu, et al., "Review of Scientific Instruments," Vol. 67, p. 1468 (1996) which is hereby incorporated by reference. The separation between the sample and the probe tip was about 6 nm to about 10 nm when the surface was inspected by the probe. The diameter of the light-emitting tip in the probe was 50 nm.

The above-described apparatus was used to inspect a fused silica wafer on which were formed 200 nm-thick chromium lines with 200 nm spaces therebetween. The probe scan rate was about 0.6 μm/sec. A spatially resolved image of the line and space pattern was obtained by mapping the measured intensity as a function of the point on the wafer at which the measurement was obtained.

As the fiber tip is pointed at the chromium part of the sample, less light is transmitted through the sample. As the fiber is pointed at the fused silica part of the sample, more light is transmitted through the sample. The light intensity transmitted through the sample is detected by the photodetectors, resulting in different amplitude of photo-current. The photocurrent current is then converted to voltage, which is read by the analog/digital converter, and subsequently the computer. This technique is widely referred to as scanned-imaging, and is well-known to one skilled in the art.

Figure 5A:
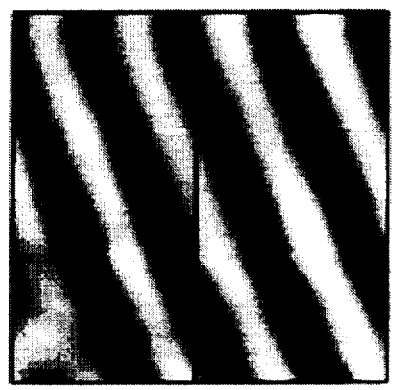
FIG. 5A illustrates a spatially resolved image of a pattern of lines and spaces obtained by integrating the signal obtained using the NSOM apparatus of the present invention.
Figure 5B:
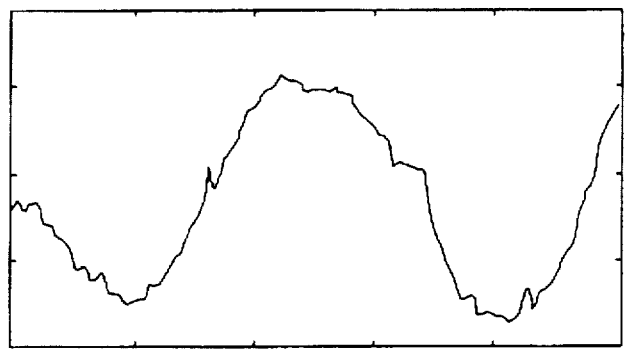
FIG. 5B is a line cut of the intensity of the signal on a line orthogonal to a series of lines and spaces.

FIG. 5A illustrates a spatially resolved image that was obtained by detecting the forbidden light transmitted through the sample using the ring-shaped photodetector in integration mode (i.e., intensity measured by the four quadrants was added). FIG. 5B is a "line cut," i.e. the figure illustrates the intensity as a function of probe position on a line orthogonal to the line and space pattern.

Figure 6A:
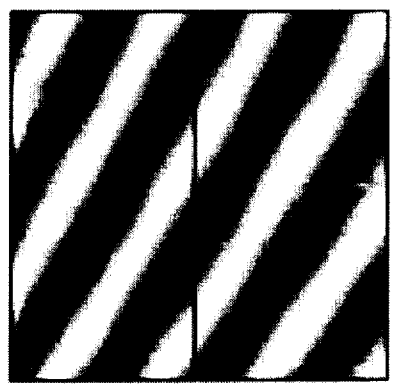
FIG. 6A illustrates a spatially resolved image of a pattern of lines and spaces obtained from a differential signal obtained using the NSOM apparatus of the present invention.
Figure 6B:
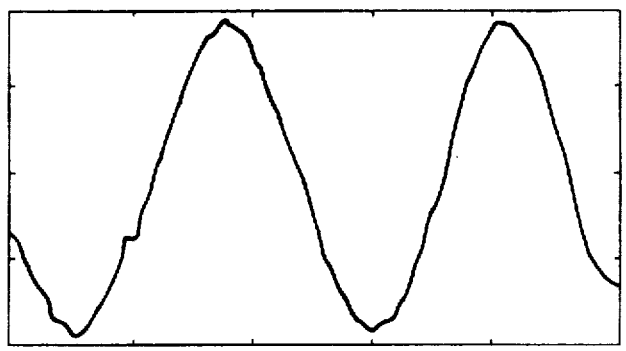
FIG. 6B is a line cut of the intensity of the signal on a line orthogonal to a series of lines and spaces using the apparatus of the present invention.

FIG. 6A illustrates a spatially resolved image that was obtained by detecting the forbidden light transmitted through the sample using the ring-shaped photodetector in the differential mode (i.e., the sum of the intensity measured by two adjacent quadrants subtracted from the sum of the intensity measured by the remaining two adjacent quadrants). FIG. 6B illustrates the intensity as a function of position on a line orthogonal to the line and space pattern. Comparing 5B with 6B, it is readily observed that noise in the signal obtained in integration mode is removed when the signal is obtained in the differential mode.

Figure 7A:
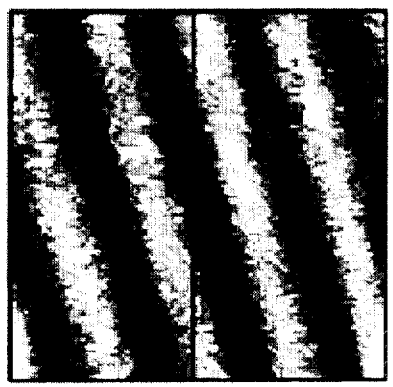
FIG. 7A illustrates a spatially resolved image of a pattern of lines and spaces obtained using a prior art NSOM apparatus which collects the allowed light transmitted through the sample.
Figure 7B:
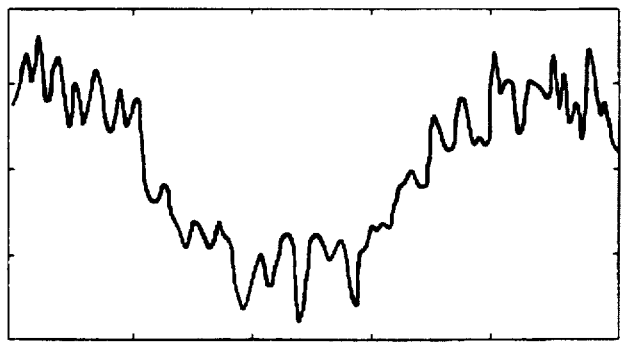
FIG. 7B is a line cut of the intensity of the signal on a line orthogonal to a series of lines and spaces using a prior art NSOM apparatus.

FIG. 7A illustrates a spatially resolved image that was obtained by detecting the allowed light transmitted through the sample using a 125× objective with a 0.8 numerical aperture. FIG. 7B illustrates the intensity as a function of position on a line orthogonal to the line and space pattern. Comparing FIG. 7B with FIGS. 5B and 6B demonstrates that the amount of noise in the signal is reduced when the forbidden light is detected instead of the allowed light.

Figure 8:
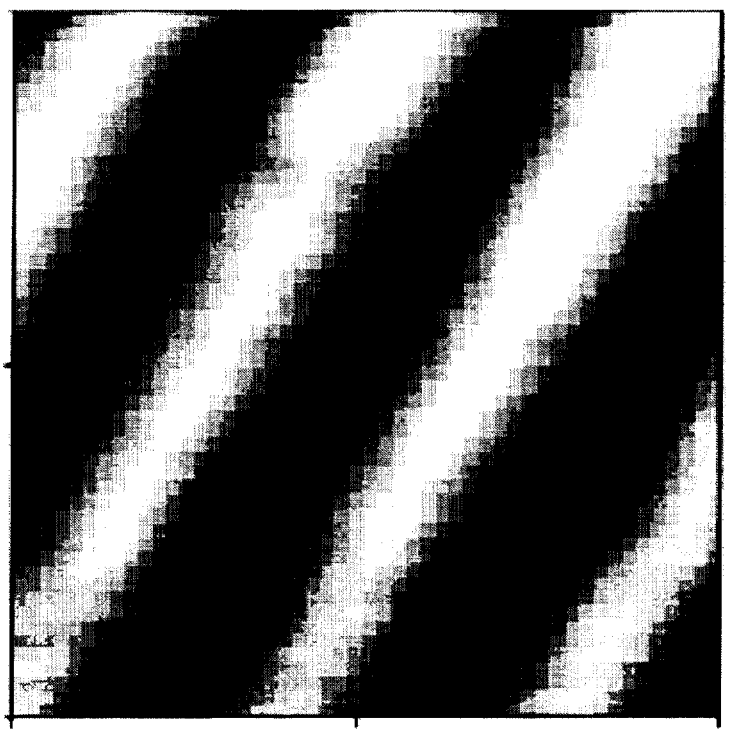
FIG. 8 illustrates a spatially resolved image of a latent image of lines and spaces in an energy sensitive material that was obtained using the apparatus of the present invention.

In a second example, the NSOM apparatus was used to inspect a latent image formed in an energy sensitive material (referred to as a resist material). The sample was a fused-silica wafer coated with an energy-sensitive material (an ARCH-II photoresist which was obtained from Olin Microelectronic Materials in East Providence, R.I.). The thickness of the resist was 0.76 μm. An image of a pattern of parallel lines and spaces with a 600 nm period was delineated into the energy sensitive material via a patternwise exposure to radiation at a wavelength of 248 nm. The exposure dose was 35 mJoules/cm$^2$. There was essentially no difference between the unexposed and exposed energy sensitive material with regard to the degree to which visible light was absorbed. The previously described apparatus with the ring-shaped detector operated in integrating mode was used to obtain a spatially resolved image of the latent image. The image that was obtained is illustrated in FIG. 8. The contrast between the image of the exposed region of the resist and the image of the unexposed region of the resist demonstrates that a very clear spatially resolved image of the latent image in the resist was obtained using the apparatus and method of the present invention.

From a spatially resolved image of latent features in a resist material, the latent feature size is measured. If these latent features are introduced using different exposure conditions (e.g. focus, exposure dose), the exposure conditions that provide the desired feature size are selected prior to feature development. For example, the present invention is used to control the lithographic process by obtaining a correlation between a lithographic parameter such as exposure dose or bake time (at a set bake temperature) of the resist and a spatially resolved image of a latent feature that resulted from the parameter. This is accomplished by varying the parameter, e.g. exposure dose, and obtaining a spatially resolved image of the latent feature from such exposure dose. The latent image features are then developed. In this manner, a correlation between exposure dose, latent image, and developed feature is obtained. During subsequent exposures, the image of the latent feature being introduced into the resist is obtained during exposure. When the latent image corresponds to the desired latent image (i.e. the latent image that correlates to the desired developed feature) the exposure step is halted. This technique is not subject to variations in lamp intensity, because the exposure is only halted when the desired latent feature is obtained.

Furthermore, the effects of the lithographic exposure apparatus on the latent features are separable from the effects of the mask on the image using the process of the present invention. This is accomplished by first exposing a certain area of the resist to a uniform dose of radiation (i.e. a blanket exposure). Keeping the exposure conditions constant, a different region on the resist on the same wafer or a corresponding region of the resist on a different wafer is exposed to patterned radiation. A spatially resolved image of the latent features is obtained for both exposures. The images are then compared. If variations in intensity are observed in the blanket exposure, they are attributed to the optical properties of the exposure apparatus. These variations are then subtracted from the image of the patterned exposure. What remains is an image of the features provided by the mask. Any variations in this image that are not attributable to the exposure apparatus are attributed to the mask. By comparing blanket exposures with patterned exposures, the process of the present invention is thereby used to determine the optical properties of the exposure apparatus and the mask used to pattern the radiation, as well as to control the parameters of the lithographic process.

What is claimed is:

1. A system for analyzing a sample comprising:
a probe having a longitudinal axis and a tip; a positioner for positioning the probe tip adjacent to a first surface of a sample; a light source which transmits light to the probe tip; and a movable stage adapted to receive the sample; wherein the sample and the probe tip are capable of relative movement such that light from the probe is directably incident on a point on the first surface of the sample; and wherein light that is excited in the sample and transmitted therethrough at an angle greater than the critical angle is forbidden light and light that is transmitted through the sample at an angle less than the critical is allowed light; and a first detector which is positioned and configured to selectively detect the forbidden light transmitted through the sample.

2. The system of claim 1 wherein the first detector is a photodiode with an aperture therein through which the allowed light is transmitted.

3. The system of claim 1 wherein the first detector is a photodiode with a region that blocks the transmission of the allowed light.

4. The system of claim 2 further comprising a second detector which is positioned to intercept the allowed light transmitted through the aperture of the first detector.

5. The system of claim 1 wherein the first detector is optically coupled to a second surface of the sample, which is opposite the first surface of the sample.

6. The system of claim 5 wherein the first detector is a photodiode.

7. The system of claim 6 wherein the photodiode is divided into a plurality of segments.

8. A process for fabricating a device comprising:
forming a layer of energy-sensitive resist material onto a substrate with a first side and a second side, wherein the energy-sensitive resist material is formed on the first side of the substrate and the second side is opposite the first side;

exposing at least a portion of the energy sensitive resist material to radiation; thereby introducing a latent feature into the energy sensitive resist material;

introducing light from a near-field probe onto the latent feature wherein at least a portion of the incident light is forbidden light incident at an angle greater than or equal to a critical angle;

detecting the forbidden light transmitted through the substrate and out the substrate second side that corresponds to the light incident on the substrate at an angle greater than or equal to a critical angle light selectively from allowed light transmitted through the substrate and out the substrate second side that corresponds to the light incident on the substrate at an angle less than the critical angle;

obtaining a spatially resolved latent image of the latent feature from the detected forbidden light;

correlating the spatially resolved image to a parameter of a lithographic process for device fabrication.

9. The process of claim 8 wherein the forbidden light is detected by a detector with an aperture through which the allowed light passes.

10. The process of claim 9 wherein the energy sensitive resist material is exposed to radiation that has been patterned by projecting the radiation through a mask and the spatially resolved image is used to characterize the mask by comparing the spatially resolved image of at least one latent feature introduced into the resist by the patterned radiation with a spatially resolved image of an energy sensitive resist material exposed to radiation that is unpatterned, and determining the effects of the mask on the latent feature.

11. The process of claim 10 wherein a lithographic exposure tool is used to subject at least a portion of the energy sensitive resist material to a blanket exposure and, by observing the changes in intensity of the blanket exposure, characterize the lithographic exposure tool by attributing the variations in intensity to components of the lithographic exposure tool.

12. The process of claim 9 wherein the spatially resolved image of the latent feature is compared with a corresponding developed feature and the correlation is used to control lithographic parameters selected from the group consisting of lamp intensity, focus, exposure dose, source coherence, and post exposure bake time by observing the spatially resolved image of the latent feature during the relevant lithographic step and controlling the step based on the correlation between the latent feature and the desired developed feature.

13. The process of claim 12 wherein the exposure dose of the energy sensitive resist material is controlled by determining a correlation between the exposure dose and the spatially resolved image of a latent feature; determining a correlation between the spatially resolved image of the latent feature and a resulting developed feature; determining the spatially resolved image that corresponds to the desired developed feature; obtaining the spatially resolved image of latent features that are introduces during subsequent exposure steps, and controlling exposure dose by monitoring the spatially resolved image of the latent feature and halting the exposure when the obtained spatially resolved image corresponds to the desired developed feature.

14. The process of claim 9 wherein the energy sensitive resist material is exposed by interposing a mask between a source of radiation and the energy sensitive resist material, and projecting the radiation through the mask and onto the energy sensitive resist material thereby introducing a latent feature therein and wherein the mask is characterized by comparing the image of the latent feature with the mask and adjusting the exposure conditions to obtain the desire conformity between the mask and the latent feature.

15. The process of claim 14 wherein the post exposure baking step is controlled by determining a correlation between the baking time and the spatially resolved image of a latent feature; determining a correlation between the spatially resolved image of the latent feature and a resulting developed feature; determining the spatially resolved image that corresponds to the desired developed feature, obtaining the spatially resolved image of latent features that are introduced during subsequent exposure steps, and controlling the baking time by monitoring the spatially resolved image of the latent image of the latent feature and halting the bake step when the obtained spatially resolved image corresponds to the desired developed feature.

16. The process of claim 8 wherein the forbidden light is detected by a detector that is a photodiode with a region that blocks the transmission of the allowed light.

* * * * *